United States Patent [19]
Staffin et al.

[11] Patent Number: 5,378,434
[45] Date of Patent: Jan. 3, 1995

[54] FLUIDIZED MULTISTAGED REACTION SYSTEM FOR POLYMERIZATION

[75] Inventors: Kenneth H. Staffin, New Brunswick, N.J.; David S. Bruce, LaGuna Beach, Calif.

[73] Assignees: Procedyne Corp., New Brunswick, N.J.; David Bruce, Laguna Beach, Calif. ; a part interest

[21] Appl. No.: 164,635

[22] Filed: Dec. 9, 1993

Related U.S. Application Data

[60] Continuation of Ser. No. 946,912, Oct. 15, 1992, abandoned, which is a division of Ser. No. 708,747, May 31, 1991, Pat. No. 5,169,913.

[51] Int. Cl.6 .................................. B01J 8/08
[52] U.S. Cl. ............................ 422/141; 422/142; 422/147; 34/370; 34/371; 34/589; 34/590; 34/591; 122/4 D; 110/245
[58] Field of Search ............... 422/141, 142, 147, 141; 34/370, 371, 589, 590, 591; 122/4 D; 110/245

[56] References Cited

U.S. PATENT DOCUMENTS

| | | | |
|---|---|---|---|
| 2,621,118 | 12/1952 | Cyr et al. | 422/141 |
| 2,829,955 | 4/1958 | Goedkoop | 422/141 |
| 4,129,701 | 12/1978 | Jezl et al. | 526/65 |
| 5,034,196 | 7/1991 | Zenz et al. | 422/141 |

*Primary Examiner*—Joseph L. Schofer
*Assistant Examiner*—Tom Weber
*Attorney, Agent, or Firm*—Kane, Dalsimer, Sullivan, Kurucz, Levy, Eisele and Richard

[57] ABSTRACT

This invention relates to a novel horizontal fluid bed reactor, which in a single unit, provides for the polymerization of monomer to polymer and mixed monomers to co-polymers. Within one reactor shell the reactor contains a plurality of polymerization stages which permit the achievement of narrow residence time distribution of the produced polymer. This arrangement also creates a sufficiently tight subdivision of the reactor volume which permits a plurality of gas circulation stages of different gas compositions, as well as, polymerization temperatures.

12 Claims, 4 Drawing Sheets

FLUIDIZED MULTISTAGED REACTION SYSTEM FOR POLYMERIZATION

This application is a continuation, of application Ser. No. 07/946,912, filed Oct. 15, 1992 now abandoned, which is a divisional of application Ser. No. 708,747, filed May 31, 1991, now U.S. Pat. No. 5,169,913.

BACKGROUND OF THE INVENTION

The application of a single stage (back mix) gas phase fluid bed reactor for the production of widely used polymers, is well established as a leading technology in the plastics industry.

In a typical single stage fluid bed polymerization reactor, the fluidized bed is finely divided polymer formed from the monomer gas, which is the fluidizing gas of the reactor. Both the monomer gas and the finely divided catalyst are continuously fed to the reactor, which is maintained at controlled conditions of pressure and temperature, and the polymer continuously formed discharges from the reactor at the rate the polymer is formed.

The polymer yield on the catalyst fed is a function of the residence time of the catalyst particles in the reactor. Since the typical single stage fluid bed polymerization reactor is a continuous back-mix reactor, the residence time distribution of the catalyst particles follows an experimental decay relationship. In other words, it is extremely broad.

In a typical operation, the unreacted monomer fluidizing gas discharged from the reactor is cooled, its composition reconstituted with fresh monomer fluidizing gas to maintain a constant steady-state, compressed, and returned to the fluid bed polymerization reactor as the fluidizing gas.

In the production of more complex polymers and co-polymers, it is known practice in the plastics industry to use more than one, typically two or three, back-mixed fluid bed reactors in series to permit changing monomer gas composition and polymerization conditions of temperature and pressure at different points in the polymerization reaction cycle to achieve desired polymers.

Typically, each back-mixed fluid bed reactor is separated from its adjacent units through feed and discharge locking devices. Each reactor is served by its own independent gas recycle and recompression system so that each reactor can be run on independently different compositions and/or combinations of monomer fluidizing gas. Since this approach is based on the polymer exiting one system and feeding to the next system in series, it has been found necessary to provide for a significant pressure drop from system to system (i.e. reactor to reactor), typically between 50 to 100 psig, to facilitate the transfer of the polymer powder.

In addition, since each back-mixed reactor system is a separate entity, the capital cost of a system of this type is high. Typically, the number of back-mixed reactors in series in a commercial installation has been limited to two or three systems by economic considerations despite the fact that there is increasing indication that a larger number of units in series to control residence time distribution and/or provide for flexible polymerization conditions would be advantageous. It has been recognized in many polymerization systems, for the production of the more complex co-polymers, that staging monomer changes in the polymerization reaction results in superior properties such as tear strength and puncture resistance in films, as well as, improved impact strength combined with flexural strength in plastic injection moldings. There are a number of polymer products that can only be made by a multi-staged polymerization process.

This situation is further demonstrated by the fact that there are examples of multistage polymerization reactor systems being used to advantage in processes other than the gas phase fluid bed processing approach.

A multi-stage polymerization system using a liquid diluent to suspend the polymer, as opposed to utilizing gas phase fluidization and passing through a plurality of agitated reactors is described in U.S. Pat. No. 3,454,675. This liquid phase processing system, when applied to such co-polymers as propylene-ethylene, has the obvious disadvantage of dissolving the portion of the co-polymer that is soluble in the liquid diluent, thereby reducing yield of polymer when the liquid is removed.

Another reaction system for co-polymerization that has some commercial application is a horizontal stirred reactor which depends on mechanical agitators to transport the polymer through the reactor to the discharge port, while the reaction is conducted in the vapor or gas phase. Some staging of the polymerization is claimed by this system, but it is limited to a single gas phase composition. One such system is described in U.S. Pat. No. 4,710,538. While benefit is obtained by the staging of the polymer flow through the horizontal reactor, the process requires the expending of excess energy in order to mechanically agitate the contents of the reactor. The process is also not very adaptable since a single monomer gas is all that can be provided to the reactor.

SUMMARY OF THE INVENTION

This invention is directed to horizontal fluid bed reactor and process for the use of same in polymerization reactions. The bed reactor is a single unit providing for the polymerization of monomer to polymer and mixed monomers to co-polymers. Within one reactor shell the reactor contains a plurality of polymerization zones which in turn are further subdivided into stages permitting the achievement of a narrow residence time distribution of the polymerized material, which approaches plug flow through the bed. As each zone can be made individual and independent of the other zones, a plurality of gas circulation stages of different gas compositions is possible, such individuality permitting a composition of gaseous monomer individual to each zone. Also, other conditions of polymerization are variable, such as pressure and temperature.

The progressive flow of polymer through the plurality of stages within a single gas flow stage, as well as the flow through the plurality of gas stages benefits the properties of the ultimately produced polymer, as well as process economics.

Generally describing the process, a fluid bed polymerization process for producing polymers from primarily gaseous monomers is conducted by passing gas streams containing one or more reacting monomers continuously through a fluidized bed reactor in the presence of a suitable catalyst. After the gas stream passes through the fluid bed, it contains unreacted monomer and other gas phase contaminates and modifiers. It is withdrawn from the reactor via a recycle system where the gases are cooled, compressed, the necessary make-up gases added (eg: fresh monomer gas), and then recycled to the reactor. The forming polymer particles in the reactor, maintained in a fluidized state by the flowing fluidizing gas, passes in series from polymer stage to stage and zone to zone is withdrawn from the last zone as polymerized product which is then subjected to a degassing and catalyst deactivation treatment.

Because each zone is suppliable with its own gas stream, and the composition of that gas stream can be selected independently of the gas compositions of the other zones, and because each zone is substantially an environment independent of the other zones, copolymerized polymer products are possible.

Each zone is subdivided by a series of baffles which preferably have openings on their sides and arranged to provide for a serpentine course of flow. This arrangement, plus the number of baffles and zones used, create a narrow residence time distribution which approximates plug flow.

The innovative polymerization system of this invention is particularly well suited for gas phase polymerization reactions involving one or more monomers that are staged in order to effect changes in gas composition or in physical conditions, such as temperature. However, a significant benefit is also derived from the multistaged flow path of the polymer, particularly when using a heterogeneous catalyst, since there is a significant improvement in yield and reaction rate due to the narrow, more uniform residence time distribution of the reacting particles in the multistage reactor of this invention.

It is particularly well suited for the polymerization of blended block copolymer of olefins, which are formed by polymerizing a second monomer onto a polymer first formed by another monomer as described in U.S. Pat. No. 3,454,675, incorporated herein by reference.

While not limited to any particular type or kind of polymerization reaction, this invention is suited to the polymerization of one or more of the monomers listed as follows:
1. Olefin type such as alpha olefin monomers having two to eight carbon atoms. Some examples are —ethylene, propylene, butene, pentene, methylpentene, hexene, styrene and octane;
2. Polar vinyl monomer type—vinyl chloride, vinyl acetate, methylmethacrylate, tetraflouroetheylene, vinyl ether, acrylonitrile;
3. Diene type;
4. Acetylene type; and
5. Aldehyde type.

Catalysts generally employed in fluid bed polymerization of the above monomers usually are:
1. Coordinated anionic catalyst;
2. Cationic catalyst for co-polymerization with ethylene only: others of this type require free radical catalyst;
3. Either a free radical catalyst or a coordinated anionic catalyst; and
4. An anionic catalyst.

DETAILED DESCRIPTION OF THE PREFERRED EMBODIMENT

Figure 1:
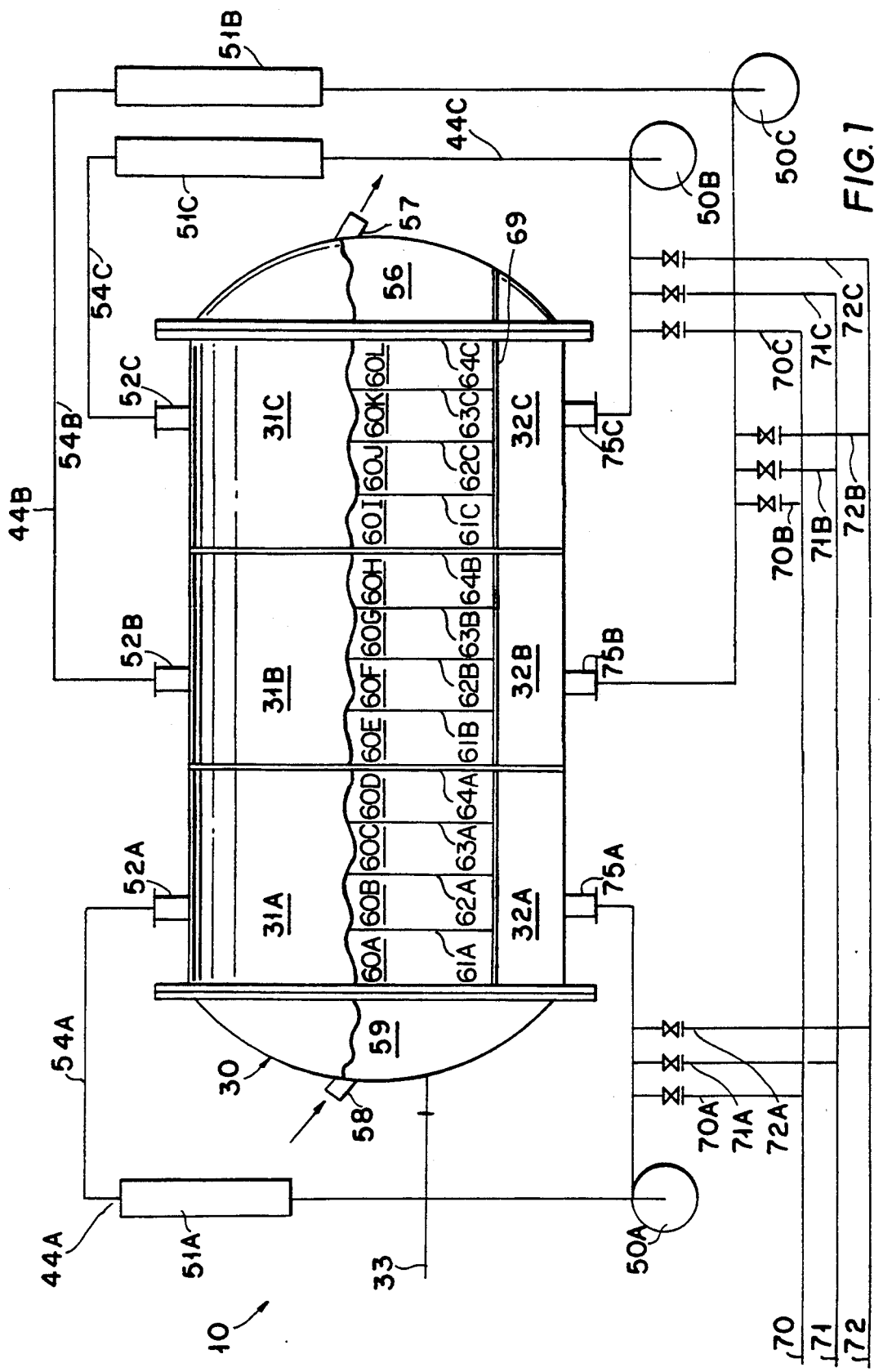
FIG. 1 is a cross sectional view of the single shell reactor system of the preferred embodiment.

While the multistaged single shell reactor of this invention is not limited to any specific type of polymerization reaction, the detailed description of the operation of this reactor is directed to the polymerization of the propylene based ethylene co-polymer. It is illustrated in FIG. 1 by a single shell reactor 10 with three full compartment separations, 31A, 31B, 31C to provide for three independent gas recirculation systems 44A, 44B, 44C, with each compartment or zone separation containing three polymer stage baffles to form four stages per zone, 60 A, B, C, and D in Zone 31A, 60 E, F, G, and H in Zone 31B, and 60 I, J, K, L in Zone 31C. Each of the three zones and gas recycle systems can be operated at different gas monomer compositions and temperatures to achieve various combinations and characteristics of polymer or co-polymer.

In a typical application, catalyst particles and/or catalyst particles plus polymer are continuously fed through feed port 58, at the feed zone, 59, which feeds into first stage 60A of the first zone 31A, and then on to successive stages. The multistage arrangement in each zone, (eg: stages 60A, B, C, and D of Zone 31A) facilitates a narrower residence time distribution of the fluidized particles in the particular zone. As the number of stages within a zone increases from one toward an infinitely large number, the residence time distribution function of the particles within the zone changes from a broad exponentially decaying function to a narrow plug flow distribution, with all particles having equal residence time in the zone.

Figure 6:
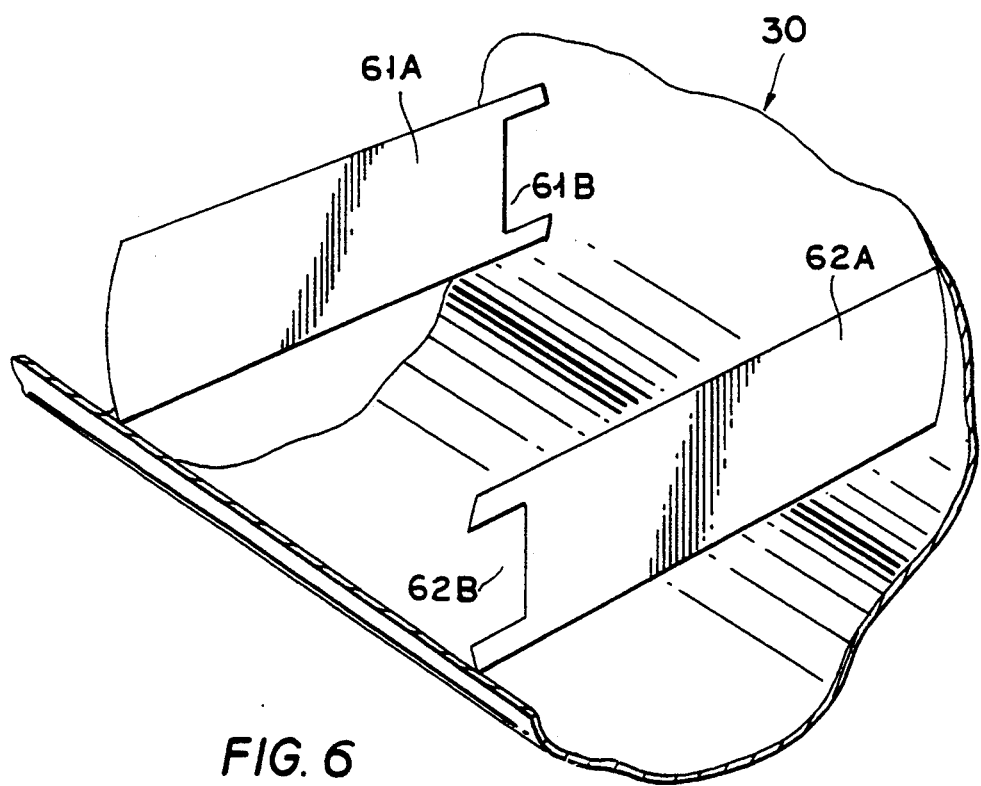
FIG. 6 is a view depicting the baffles of the preferred embodiment.

The passage of fluidized polymer from stage to stage within a given zone as shown in FIG. 1 is typically accomplished by providing alternating passage ports upon the baffles as shown in FIG. 6, to accomplish the continuous flow. This creates a serpentine course for the fluidized polymer to flow. By way of example, passage ports 61B and 62B are shown for baffles 61A and 62A. These ports appear at opposite ends of the baffles adjacent opposite side walls of the reactor vessel, and provide a means for a serpentine course of flow.

Since there is a continuous feed at the feed end of the unit, plus additional polymer being formed within the stages of the successive zones, the growing weight, and as well as the bed levels in the zones, provides the driving force to keep the fluidized bed of solids moving toward and then through the discharge zone of the unit, 56, and then out through the discharge port of the vessel, 57.

In the illustrated example of FIG. 1 with three zone subdivisions, each containing four stages, the zone subdividing walls 64A, 64B, and 64C, are sealed to the shell wall in the plenum volumes 32A, 32B and 32C, in the fluid bed; and in the freeboard volumes above, the fluid bed 31A, 31B, and 31C, and thereby keeping the fluidizing gases and gases to be recycled separate from the respective gases of each adjacent zone.

Figure 2:
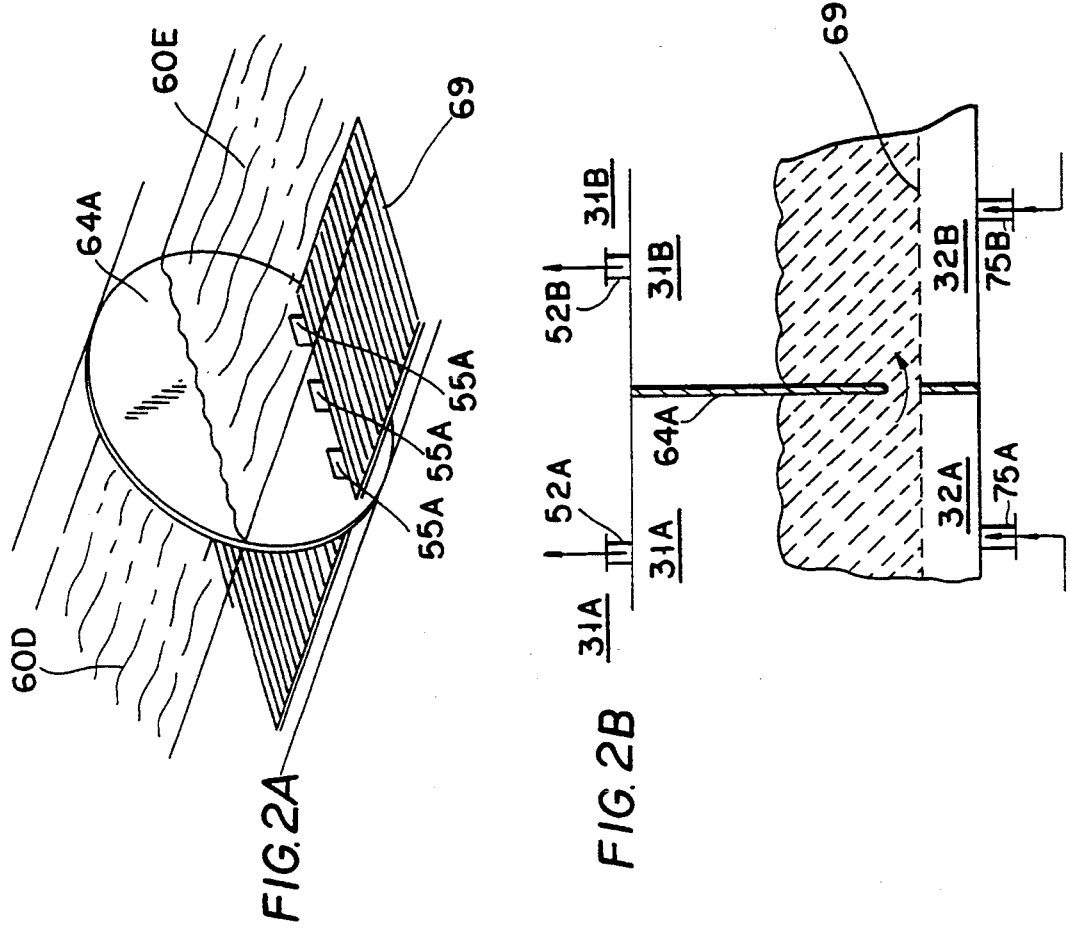
FIG. 2a is a view of the zone subdividing walls of the preferred embodiment.
FIG. 2b is a cross sectional view of the zone dividing walls of the preferred embodiment.

The fluidized bed of polymer and catalyst pass from one zone to the adjacent zone as shown in FIGS. 2a and 2b (representatively shown at zone wall 64A) through ports 55A, 55B and 55C in 64A, 64B, and 64C, respectively. The ports are preferably located below the surface of the fluid bed near the level of the distributor plate, 69. By limiting the ratio of the area of the ports to the area of the separating wall 64A to a range of 1% to 2%, the extent of leakage of gas phase between adjacent zones, 31A and 31B for example, can be typically limited to 3% to 5% of the gas flow rate being circulated in the recycle systems serving each zone.

Figure 3:
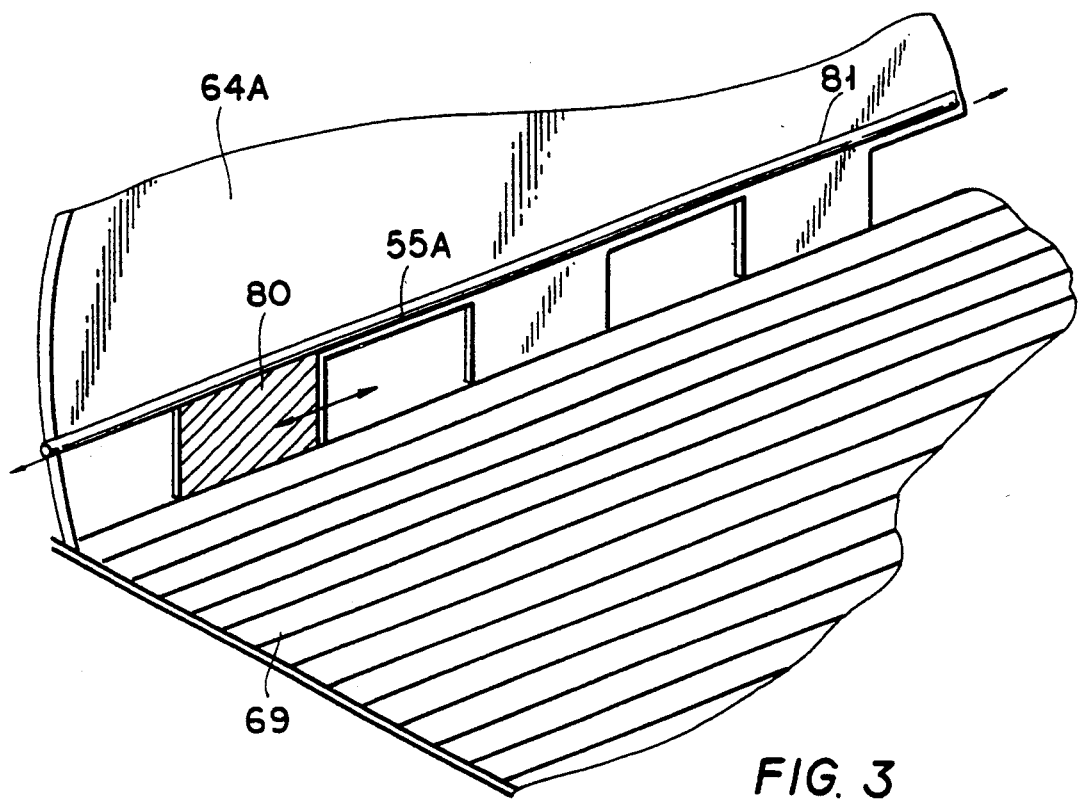
FIG. 3 is a perspective view of the zone dividing walls and closure means therefore of the preferred embodiment.

For situations requiring even less gas mixing, the fluid bed flow ports can be equipped with closures as shown in FIG. 3 They are shown with respect to flow ports 55A zone dividing wall 64A but are likewise present at 64B and 64C. In these cases, the ports are opened on a timed cycle by periodically opening the closures to facilitate the semi-continuous flow of the fluid bed polymer and catalyst. The opening and closing can be accomplished, for example, using the sliding rod 81 and closure 80 in FIG. 3 to open and close port 55A. Mechanical, manual, or other known means can be provided to drive the closure system. Such an arrangement can so limit gas mixing between stages to 0.5% to 2%.

In a typical application, the catalyst particles and/or catalyst particles plus polymer continuously fed through feed port 58 at feed zone, 59, continuously flows into successive reaction stages 60 A, B, C, D, then 60 E, F, G, H, then 60 I, J, K, L. In the reaction zones and within the stages, the growing and formed polymer particles are fluidized by the continuous flow of the gas stream which contains monomers. Fluidizing gas enters each zone, respectively at 75A, 75B and 75C. The fluidizing gas streams consist of the recycle gas from recycle systems 44A, 44B, and 44C, the make-up monomer gases from 70, 71, and 72. Make up monomer gas lines 70, 71, and 72, join the recycle system 44A, 44B, and 44C through supply lines 70A, 70B, 70C, 71A, 71B, 71C, 72A, 72B, and 72C, along with any necessary polymer modifiers or diluent gases. The plurality of make up monomer gas lines (70A, 70B, 70C, 71A, 71B, 71C, 72A, 72B, and 72C), each of which can contain a different gaseous monomer or composition, permit the process operator to select the composition of the monomer gas separately and independently for each zone. A fluidized bed is maintained by controlling the circulating gas rate to maintain a suitable fluidization velocity dependent on the size and density of the particles in given reaction zone.

To start up the reactor, the reaction zones 31A, 31B, and 31C are charged with polymer particles before gas circulation. Preferably this polymer may be close to the composition of the polymer to be formed when the reactor is running under steady-state conditions. The partially or totally activated catalyst and/or catalyst with polymer particles is typically fed through feed port 58 at feed zone 59 from a supply tank (not shown) which is blanketed with a gas which is inert to the reactants. The feed is introduced into the first polymer stage, 60A, through the feed port 58 and through the feed zone 59.

Pressure drop of the fluidizing gas flowing through the polymer bed is a function of the weight of the polymer bed divided by the cross sectional area. As the bed depth of conventional single stage vertical fluid bed reactor is approximately five times greater than that of the horizontal reactor of this invention. The present invention provides for a much lower pressure drop than such reactors. As noted, make-up feed is added to the circulating gas stream through lines 70, 71, and 72. The amount of make-up gas is determined by a conventional gas analyzer which measures the composition of the recycle streams 44A, 44B, and 44C and adjusts the feed streams (75 A, B, and C) to maintain the desired gas phase composition.

The fluidizing gas streams to the reactor that do not react while passing through the polymer bed become the off-gas recycle streams. In passing through the freeboard volume above the bed, the entrained polymer is disengaged and falls back to the bed. In some cases, any additional entrained polymer is filtered from the gas stream and returned to the bed. Each recycle gas stream after leaving the reactor through exit ports 52A, 52B, 52C is cooled in heat exchangers (51 A, B, and C) shown in FIG. 1 then pumped with compressors (50 A, B and C), mixed with the make-up gases to adjust composition, and returned to the reactor. The sequence of cooling and compression can be reversed when this proves economically advantageous.

Polymerization reactions of the monomers that this invention is applicable to are exothermic. Therefore, it is necessary to remove the heat of reaction from reaction stages 60A through L, to maintain the predetermined required polymerization temperature level in each stage to achieve desired polymers. This is accomplished by cooling the fluidizing gas stream and using the heat capacity of the fluidizing gas stream to remove heat from the fluid bed. The temperatures of the fluidizing gas entering feed ports 75 A, B, and C are kept sufficiently below the fluid bed temperature in the respective stages to accomplish the required energy balance of the zone. The fluidizing off-gas discharging from the fluid bed into the freeboard volumes 31A, 31B, and 31C is very close in temperature to the temperature of the respective fluid beds in each stage due to the intimate contact of the fluidizing gas with the high surface area of the catalyst and polymer particles.

Polymerization rate is a function of catalyst concentration, partial pressure of reacting monomers, and temperature. Polymer yield for a given catalyst is also a function of residence time in the reaction zone for each particle.

In addition to the temperature control in the reaction zones maintained by the previously described cooling capacity of the fluidizing gas, the heat of reaction release rate is limited by the feed rate of catalyst and catalyst plus polymer to the fluid bed reactor. In most cases, the temperature in the reaction zones are programmed to achieve particular polymer properties. Pressure is controlled at a sufficiently high level to achieve the highest possible rate consistent with the ability of the system to maintain a heat balance.

The polymer bed which consists of particles increasing in size as the polymerization proceeds flows through the reactor zone around each baffle and through the slots 55A, 55B, 55C in each zone dividing wall (64A, 64B and 64C). These slots, illustrated by way of example in FIG. 3 for 64A and 55A but also found at 64B/55B and 64C/55C are located just above, or in the vicinity of, the distributor plate 69. The area and location of these slots are selected so as to minimize the gas mixing between zones, as well as, to facilitate the transport of the polymer through the walls between each gas stage.

In the multistage horizontal reactor of this invention, the pressure drop driving force from stage to stage which maintains flow of polymer is accomplished by the fluid bed level at the feed end of the reactor being slightly higher in level than at the overflow port. This is analogous to hydrostatic head which maintains the flow of a liquid in a long channel. Typical level increases are of the order of 2 to 4 inches of water column per twenty feet of reactor length. In the same way, when the fluidized polymer and catalyst particles pass through the slots in the zone separation partitions 61A, 62A, 63A, 64A; 61B, 62B, 63B, 64B; 61C, 62C, 63C, 64C, the pressure drop is of the order of 0.2 to 0.5 inches of water column which is reflection in an equivalent drop in fluid bed level between successive zones.

The typical amount of gas phase mixing between adjacent independent gas recycle systems 44A, 44B, 44C due to flow of gas phase through these transfer slots 55A, 55B, 55C has been estimated to be less than a range of 3 to 5 per cent of the gas circulation rate in the gas recycle system. However, closing these ports on a timed cycle using the mechanical damper 80 shown in FIG. 3, is estimated to reduce the gas mixing through these ports to a range less than 0.5 to 2 per cent of the gas circulation rate. This feature may prove quite beneficial when performing polymerization reactions requiring large composition differences between adjacent gas recycle zones to achieve particular polymer properties.

The temperature of the fluid bed should be kept below the temperature at which the polymer particle will agglomerate or fuse together. In general the homopolymers have a higher fusing temperature than their corresponding co-polymers.

The fluid bed reactor may be operated at a pressure of up to a 1000 psig, but for polyolefin resins pressures from 100 to 400 psig are sufficient to achieve required polymerization reaction rates. Operation at the higher pressure levels permit higher polymerization reaction rates since an increase in pressure benefits both the polymerization rate due to higher partial pressure of monomer, and the heat removal rate by the discharging fluidizing gas due to the higher heat capacity of the denser gas phase.

On discharge of the polymer product from the reactor it is preferable to separate the gas fluid from the polymer particles and return the fluid to the recycle stream, generally referred to as "degassing". There are several ways known to the art to do this. The multistage reaction system of this invention permits effective degassing the fluid from the polymer. To add this feature, it is only necessary to provide a separate final gas stage operating with inert gas as the fluidizing gas, and refrain from any monomer make up to this recycle stream. This will cause the residual monomer in the polymer to polymerize, thereby the polymer is made free of monomer entrainment to minimum concentration.

The use of the baffle maze to form the required number of stages within a zone serves to control the residence time distribution of the reacting particles. As the number of stages in each zone increases from one to the four shown in FIG. 1 or even a greater number, the residence time of the particles in each zone become more uniform approaching the ultimate, i.e. plug flow.

A uniform residence time of particles through the several stages of the multistage reactor results in several important polymer properties, as well as, the improvement in yield of product from any given reaction system. In the horizontal multistage reactor, each discrete polymer particle has a residence time to contact with the circulating gas closer to the average of all particles. Therefore, a more uniform composition results. In contrast, in a conventional single stage vertical fluid bed reactor the path of polymer particles is subject to what is termed back-mix agitation. In such a reactor the discrete polymer particle has a statistical residence time which is a decaying exponential function which is very broad; i.e., the residence time of reaction from particle to particle is very different. Improvements in catalyst utilization (yield of polymer per unit mass of catalyst) can exceed 20% as a result of uniform reaction residence time in a heterogeneous catalyst reaction.

Because of the more uniform exposure of the polymer particle to the circulating gas in the horizontal multistage reactor the control of stickiness experienced when producing co-polymers is materially improved. Due to the narrow residence time distribution in this reactor the polymer uniformly formed in the first gas phase contains fewer "short reaction time particles" and will develop less stickiness as it progresses through the succeeding gas stages to form the desired copolymer from the monomers and co-monomers.

The benefit of pressure on the polymerization reaction was mentioned earlier. In the single shell multistage reactor there is negligible pressure drop between gas recycle zones (differentials in terms of inches of water). However, in single stage vertical reactors used in series there must be a significant pressure drop to facilitate the transfer out of one reactor into the succeeding unit. Pressure drops of 50 to 100 psig are usual. Elimination of this large stage to stage pressure drop in the single multistage reactor results in an advantage of 20 to 40 per cent in reaction rate due to the higher average operating pressure in this reactor; i.e., higher productivity per volume of reactor (higher space time yields).

In addition, the cost of construction of a facility using a single shell multistage reaction system for the production of such co-polymers as are made from the lower alpha olefins (C2 to C8) is less than a comparable plant based on conventional single stage vertical reactors deployed in series to accomplish the same number of gas recycle zones. The savings occurs from the use of a single rector shell instead of multiple units to accommodate each zone. The elimination of the accessory equipment required between reactors further reduces the capital equipment cost.

A typical polymerization, a propylene-ethylene copolymer, to be produced in the three zone reactor of FIG. 1, is summarized in the following example. The yield of polymer per zone is estimated based on material balance considerations, and polymerization rate information:

EXAMPLE 1

The co-polymer to be prepared is a bimodal propylene based ethylene co-polymer:

The first gas recycle feed to Zone 1 has the following composition:

|  | Volumer Percent |
|---|---|
| Ethylene | — |
| Propylene | 82.5 |
| Hydrogen | 17.5 |
| Pressure | 300 PSI |
| Temperature | 65° C. |

Catalyst System

A hetrogeneous supported transition metal catalyst with an activator (alkyl) and electron donor.

The homopolymer formed and transported $(C_3H_6)X$ —82 lbs/hr.

The second gas recycle feed to Zone 2 has the following composition:

|  | Volume Percent |
| --- | --- |
| Ethylene | 14.1 |
| Propylene | 69.2 |
| Hydrogen | 16.7 |

The co-polymer formed
$(C_2H_4)X$ —15 lbs/hr. —18.3 weight percent
$(C_3H_6)X$ —67 lbs/hr. —81.7 weight percent.
The total solid formed and transported
$(C_2H_4)X$ —15 lbs/hr. —9.3 weight percent
$(C_3H_6)X$ —149 lbs/hr. —90.8 weight percent The third gas recycle feed to Zone 3 has the following composition:

|  | Volume Percent |
| --- | --- |
| Ethylene | 15.3 |
| Propylene | 36.1 |
| Hydrogen | 48.6 |

The co-polymer formed
$(C_2H_4)X$ —29 lbs/hr. —35.4 weight percent
$(C_3H_6)X$ —53 lbs/hr. —64.6 weight percent
The total solids formed and transported
$(C_2H_4)X$ —44 lbs/hr. —17.9 weight percent
$(C_3H_6)X$ —202 lbs/hr. —82.1 weight percent The total chemically blended polymer produced —246 lbs/hr.

For this example of the three zone reactor shown in FIG. 1, each zone is shown with three stage baffles forming four stages in each zone.

Figure 4:
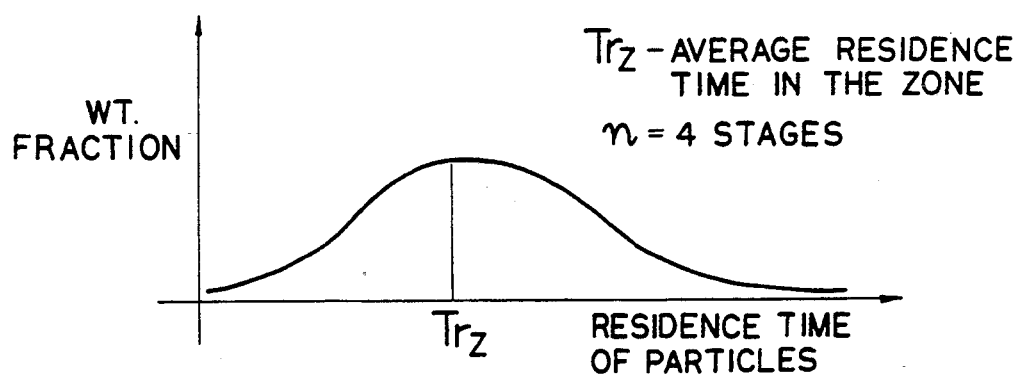
FIG. 4 shows the distribution of residence time around average residence time in a zone for the particle residence time distribution for the four stages within a zone.

The particle residence time distribution for four stages within a zone is shown in FIG. 4 as a distribution of residence time around the average residence time in the zone.

Figure 5:
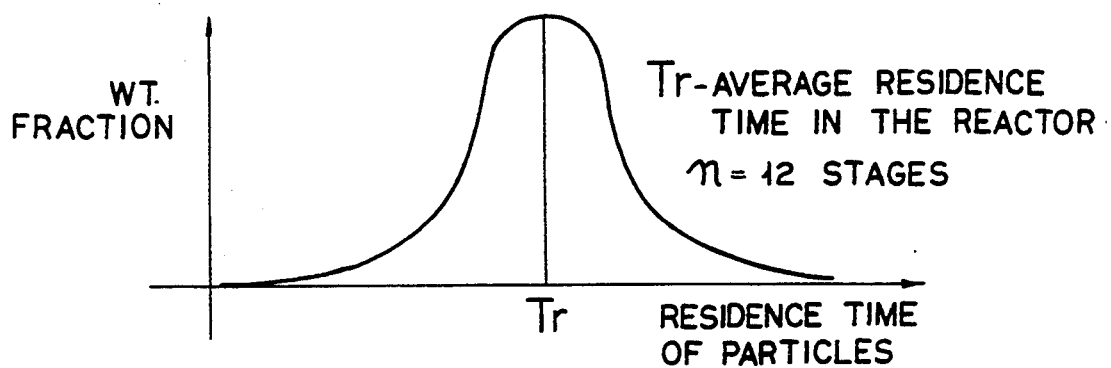
FIG. 5 shows the particle residence time around the average residence time in the reactor.

The particle residence time distribution through the three zones comprising twelve stages is shown in FIG. 5 as a distribution of residence time around the average residence time in the reactor.

We claim:

1. A fluidized bed apparatus suitable for use in polymerization reactions comprised of:
   a) a single horizontal fluid bed reactor vessel;
   b) a gas distributor plate extending horizontally within the vessel and being constructed and arranged for passage of gas therethrough for fluidizing particulate material;
   c) an inlet means permitting the introduction into the vessel of solid particulate materials utilized in the polymerization reactors;
   d) zone dividing walls which divide the vessel into a plurality of zones and which extend substantially perpendicular to and above and below the distributor plate;
   e) baffles within each zone which divide the zones into a plurality of stages;
   f) the baffles having apertures for permitting polymerized material to flow and be introduced into the next downstream stage by fluidized horizontal flow;
   g) at least one zone dividing wall having an aperture permitting a polymerized material to be introduced into the next downstream zone by fluidized horizontal flow;
   h) inlet means associated with each zone for permitting entry of a gaseous component capable of being polymerized into each stage and in such a manner through the distributor plate to maintain fluidization integrity of the particulate material and particles as they are transported between stages and between zones;
   i) gas outlet means associated with each zone for removing the gaseous component from each zone;
   j) outlet means permitting the removal of polymerized material from the vessel; and
   k) recycling means for recycling the gaseous monomer exiting through the gas outlet means, said means being in communication with the inlet means for introducing gaseous monomer to each stage, said recycling means being individual for each of the inlet means;
   l) gaseous supply means separate and independent for each zone;
   m) said inlet means being further in communication with the gaseous supply means.

2. The fluidized bed apparatus as set forth in claim 1 wherein the apertures in the zone dividing walls are selectively sized and located in order to keep gas phase mixing through the slots to less than the range of 3% to 5%.

3. The fluidized bed apparatus as set forth in claim 1 wherein the polymeric solid material flows through apertures which are preselectively closed on a timed cycle by closure means to reduce the extent of gas phase mixing through the apertures to less than 2%.

4. The fluidized bed apparatus as set forth in claim 1 wherein the apertures upon the baffles are located on alternate outer edges of the baffles to create a serpentine course of flow for the polymeric material.

5. The fluidized bed apparatus as set forth in claim 1 wherein the zone dividing walls substantially seal a particular zone from its adjacent zone or zones.

6. The fluidized bed apparatus as set forth in claim 1 wherein the gaseous supply means for each zone is comprised of a plurality of gas lines permitting selection of a gaseous monomer composition individual to each zone.

7. The fluidized bed apparatus of claim 6 wherein the gaseous component individual to each zone differs with respect to at least one other zone.

8. The fluidized bed apparatus as set forth in claim 1 wherein the number of baffles present within each zone is sufficient to cause a plug flow profile through the reactor.

9. A fluidized bed apparatus suitable for use in polymerization reactions comprised of:
   a) a single horizontal fluidized bed reactor vessel;
   b) a gas distributor plate extending horizontally within the vessel and being constructed and arranged for passage of gas therethrough for fluidizing particulate material;
   c) an inlet means permitting the introduction into the vessel of solid particulate materials utilized in the polymerization reactions;
   d) zone dividing walls which divide the vessel into a plurality of zones and which extend substantially perpendicular to and above and below the distributor plate;

e) baffles within each zone which divide the zones into a plurality of stages;

f) the baffles having apertures for permitting polymerized material to be transported due to fluidized gravity flow of polymerized material in the form of growing polymer particles and permitting the polymerized material to be introduced into the next downstream stage by fluidized horizontal flow;

g) at least one zone dividing wall having an aperture permitting the polymerized material to be introduced into the next downstream zone by fluidized horizontal flow;

h) inlet means associated with each zone for permitting entry of a gaseous component capable of being polymerized into each stage and in such a manner through the distributor plate to maintain fluidization integrity of the particulate material and particles as they are transported between stages and between zones;

i) gas outlet means associated with each zone for removing the gaseous component from each zone;

j) outlet means permitting the removal of polymerized material from the vessel; and k) recycling means for recycling the gaseous monomer exiting through the gas outlet means, said recycling means being in communication with the inlet means for introducing gaseous monomer to each stage, said recycling means being individual for each of the inlet means;

l) gaseous supply means separate and independent for each zone;

m) said inlet means being further in communication with the gaseous supply means.

10. A fluidized bed apparatus suitable for use in polymerization reactions comprised of:

a) a single horizontal fluidized bed reactor vessel;

b) a gas distributor plate extending horizontally within the vessel and being constructed and arranged for passage of gas therethrough for fluidizing particulate material;

c) an inlet means permitting the introduction into the vessel of solid particulate materials utilized in the polymerization reactions;

d) zone dividing walls which divide the vessel into a plurality of zones and which extend substantially perpendicular to and above and below the distributor plate;

e) baffles within each zone which divide the zones into a plurality of stages;

f) the baffles having apertures for permitting polymerized material to flow and be introduced into the next downstream stage by fluidized horizontal flow;

g) at least one zone dividing wall having an aperture permitting the polymerized material to be introduced into the next downstream zone by fluidized horizontal flow;

h) inlet means associated with each zone for permitting entry of a gaseous component capable of being polymerized into each stage and in such a manner through the distributor plate to maintain fluidization integrity of the particulate material and particles as they are transported between stage and between zones;

i) gas outlet means associated with each zone for removing the gaseous component from each zone and heat associated with the polymerization reaction;

j) outlet means permitting the removal of polymerized material from the vessel; and k) recycling means for recycling the gaseous monomer exiting through the gas outlet means, said recycling means being in communication with the inlet means for introducing gaseous monomer to each stage, said recycling means being individual for each of the inlet means, said recycling means being provided with cooling means for reducing the temperature of the gaseous monomer;

l) gaseous supply means separate and independent for each zone;

m) said inlet means being further in communication with the gaseous supply means.

11. A fluidized bed apparatus suitable for use in polymerization reactions comprised of:

a) a single horizontal fluidized bed reactor vessel;

b) a gas distributor plate extending horizontally within the vessel and being constructed and arranged for passage of gas therethrough for fluidizing particulate material;

c) an inlet means permitting the introduction into the vessel of solid particulate materials utilized in the polymerization reactions;

d) zone dividing walls which divide the vessel into a plurality of zones and which extend substantially perpendicular to and above and below the distributor plate;

e) baffles within each zone which divide the zones into a plurality of stages;

f) the baffles having apertures for permitting polymerized material to flow and be introduced into the next downstream stage by fluidized horizontal flow;

g) at least one zone dividing wall having an aperture permitting the polymerized material to be introduced into the next downstream zone by fluidized horizontal flow;

h) inlet means associated with each zone for permitting entry of a gaseous component capable of being polymerized into each stage and in such a manner through the distributor plate to maintain fluidization integrity of the particulate material and particles as they are transported between stages and between zones;

i) gas outlet means associated with each zone for removing the gaseous component from each zone;

j) outlet means permitting the removal of polymerized material from the vessel; and k) recycling means for recycling the gaseous monomer exiting through the gas outlet means, said recycling means being in communication with the inlet means for introducing gaseous monomer to each stage, said recycling means being individual for each of the inlet means;

l) gaseous supply means separate and independent for each zone, the gaseous supply means being comprised of a plurality of gas lines permitting selection of at least one gaseous monomer individual to each zone:

m) said inlet means being further in communication with the gaseous supply means.

12. A fluidized bed apparatus suitable for use in polymerization reactions comprised of:

a) a single horizontal fluidized bed reactor vessel;

b) a gas distributor plate extending horizontally within the vessel and being constructed and arranged for passage of gas therethrough for fluidizing particulate material;

c) an inlet means permitting the introduction into the vessel of solid particulate materials utilized in the polymerization reactions;

d) zone dividing walls which divide the vessel into a plurality of zones and which extend substantially perpendicular to and above and below the distributor plate;

e) baffles within each zone which divide the zones into a plurality of stages;

f) the baffles having apertures for permitting polymerized material to be transported due to fluidized gravity flow of polymerized material in the form of growing polymer particles and permitting the polymerized material to be introduced into the next downstream stage by fluidized horizontal flow;

g) at least one zone dividing wall having an aperture permitting the polymerized material to be introduced into the next downstream zone by fluidized horizontal flow;

h) inlet means associated with each zone for permitting entry of a gaseous component capable of being polymerized into each stage and in such a manner through the distributor plate to maintain fluidization integrity of the particulate material and particles as they are transported between stages and between zones;

i) gas outlet means associated with each zone for removing the gaseous component from each zone and heat associated with the polymerization reaction;

j) outlet means permitting the removal of polymerized material from the vessel; and k) recycling means for recycling the gaseous monomer exiting through the gas outlet means, said recycling means being in communication with the inlet means for introducing gaseous monomer to each stage, said recycling means being individual for each of the inlet means, said recycling means being provided with cooling means for reducing the temperature of the gaseous monomer;

l) gaseous supply means separate and independent for each zone, the gaseous supply means being comprised of a plurality of gas lines permitting selection of at least one gaseous monomer individual to each zone;

m) said inlet means being further in communication with the gaseous supply means.

* * * * *